United States Patent [19]

Drulard

[11] 4,447,847

[45] May 8, 1984

[54] PORTABLE LIGHTNING ROD

[76] Inventor: Norman R. Drulard, Portland, Oreg.

[21] Appl. No.: 946,729

[22] Filed: Sep. 28, 1978

Related U.S. Application Data

[63] Continuation-in-part of Ser. No. 770,419, Feb. 22, 1977, abandoned.

[51] Int. Cl.³ .............................................. H02H 9/04
[52] U.S. Cl. .................................................... 361/117
[58] Field of Search .................. 361/1, 117, 132, 212, 361/216, 217, 218, 219, 220; 135/16, 19.5, 38, 39, 25 R, 26, 28, 36 R, 20 M; 343/883, 720, 901, 904, 889; 104/109; 174/2, 3, 558, 556, 6, 7, 4 R

[56] References Cited

U.S. PATENT DOCUMENTS

| | | | |
|---|---|---|---|
| 110,778 | 1/1871 | Munson | 174/3 |
| 175,933 | 4/1876 | Cole | 174/3 |
| 356,531 | 1/1887 | Grimes | 174/3 |
| 1,313,966 | 8/1919 | Tankersley | 135/25 R |
| 1,642,336 | 9/1927 | Friedrichs | 135/25 R |
| 1,774,909 | 9/1930 | Wells . | |
| 2,491,601 | 12/1949 | Bernstein et al. | 343/901 |
| 2,743,146 | 4/1956 | Wheeler . | |
| 2,747,592 | 5/1956 | Epstein | 135/19.5 |
| 3,160,165 | 12/1964 | Greenbie | 135/25 R |
| 3,619,773 | 11/1971 | Lothrop . | |
| 3,893,005 | 7/1975 | Corbin | 361/218 |
| 4,033,366 | 7/1977 | Forget | 135/36 F |

OTHER PUBLICATIONS

"Electrical Transients in Power Systems" by Allan Greenwood, John Wiley and Sons, Copyright 1971, pp. 306-311.

"Lightning Protection" by R. H. Golde, 1973, pp. 31-37, 56-60, 85-88, 178-188.

"Lightning Protection for Electrical Systems" by Edward Beck, McGraw Hill, 1954, pp. 22-26, and 282-284.

Primary Examiner—Patrick R. Salce
Attorney, Agent, or Firm—Klarquist, Sparkman, Campbell, Leigh & Whinston

[57] ABSTRACT

A portable lightning rod includes an upper electrode disposed at its uppermost end for receiving an electric charge from lightning, a lower electrode disposed at its lower end for physical and electrical contact with the earth and an electrical conductor connecting the upper and lower electrodes. The conductor is insulated from the environment by an insulative outer layer and is constructed so that the rod may be extended for use, or retracted for storage or transportation. An umbrella sheath is usable with the lightning rod to provide shelter from rain and to demarcate an area of lightning protection. An alternative lower electrode is disclosed for physical and electrical contact with water.

15 Claims, 11 Drawing Figures

U.S. Patent May 8, 1984 Sheet 1 of 2 4,447,847
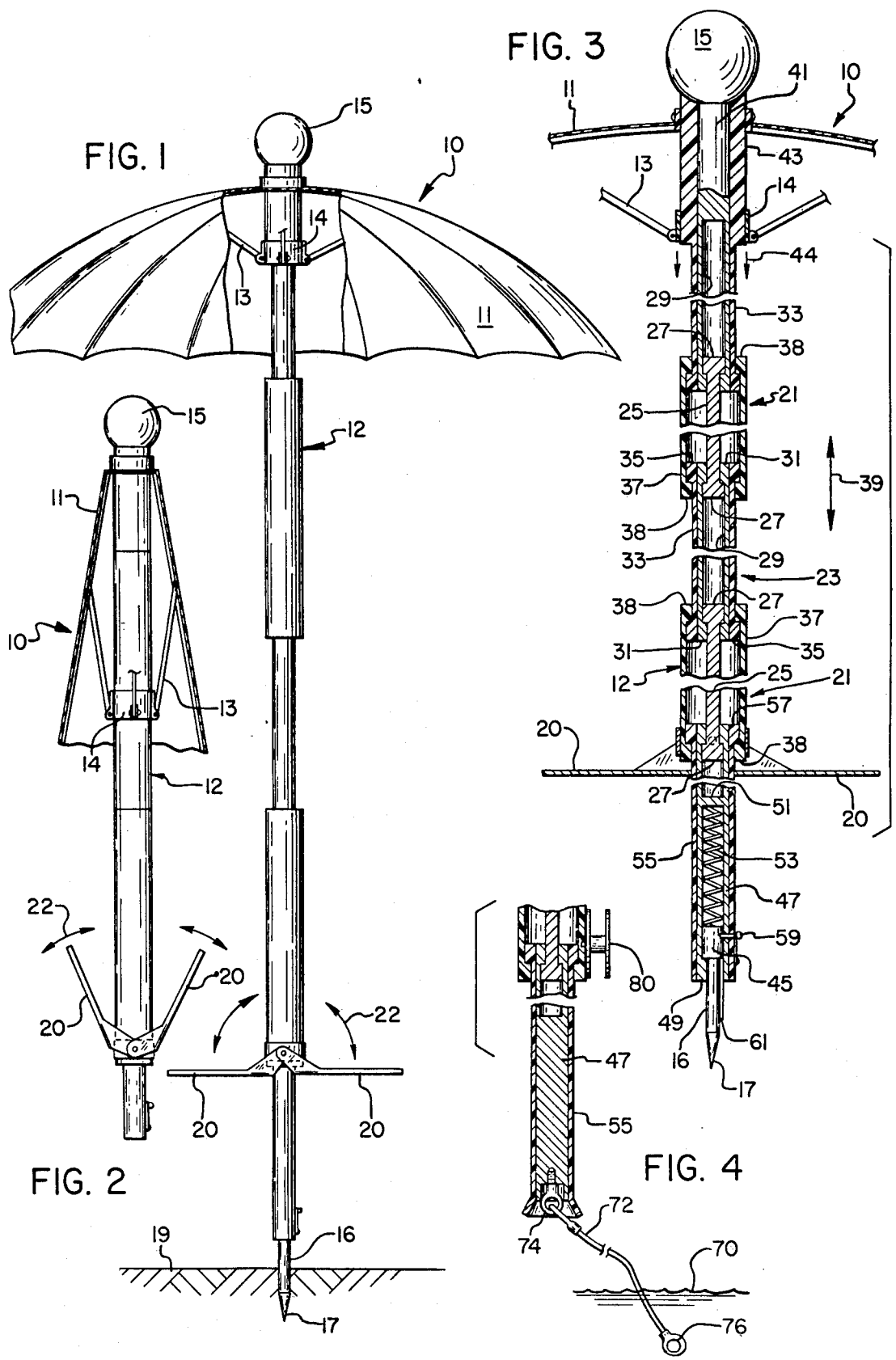

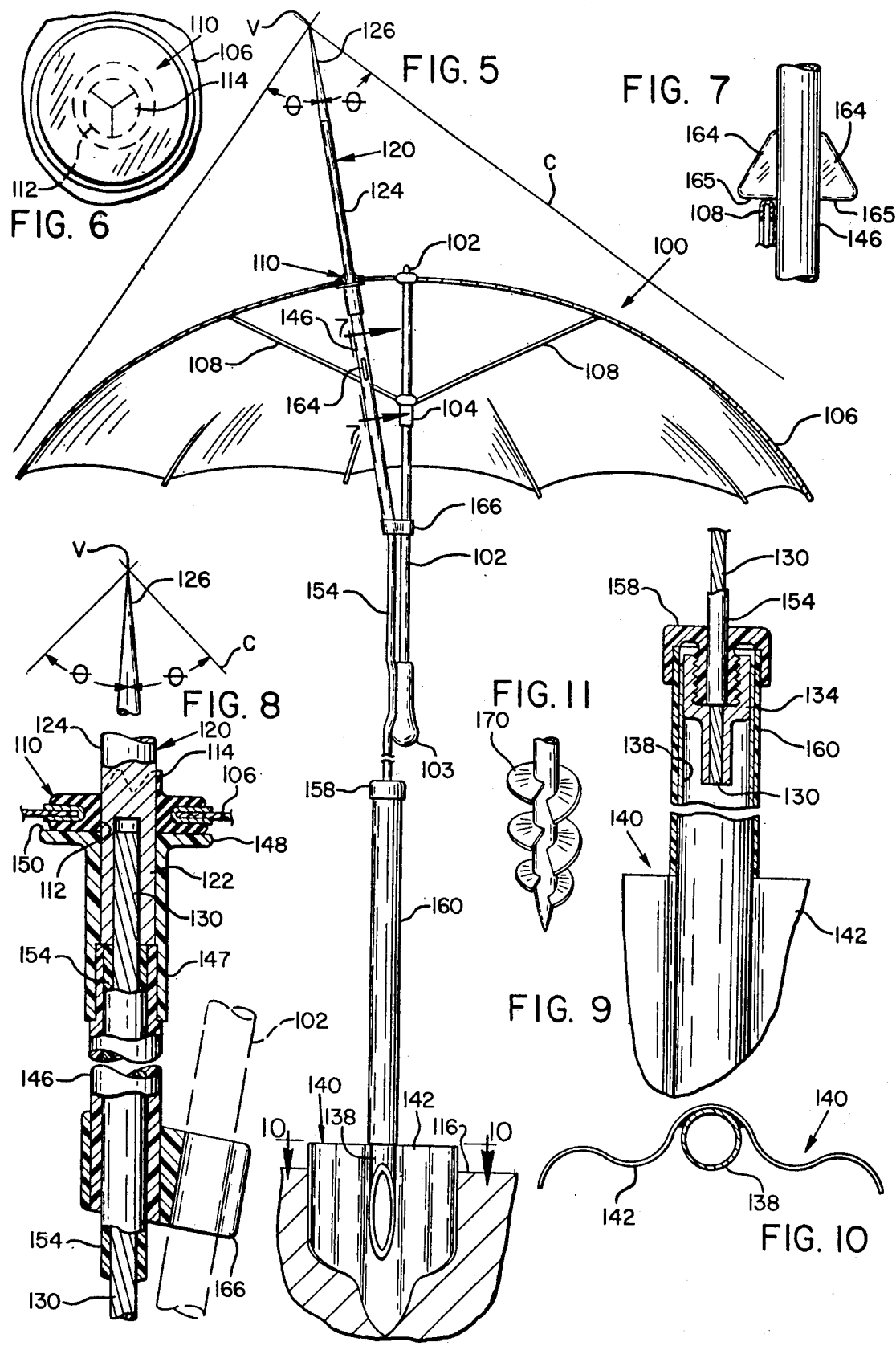

PORTABLE LIGHTNING ROD

CROSS REFERENCE TO RELATED APPLICATION

This is a continuation-in-part application of my copending U.S. Pat. application, Ser. No. 770,419, filed Feb. 22, 1977, and entitled "Portable Lightning Rod with Umbrella," and now abandoned.

BACKGROUND OF THE INVENTION

The present invention relates generally to lightning rods, and in particular to an insulated portable lightning rod to provide a user with lightning strike protection and which may be used with an umbrella sheath to provide shelter from rain during a lightning storm. During a lightning storm a person in an open area such as a golf course or in a vessel on a body of water is exposed to the hazard of electrical shock attendant to lightning strikes, and possibly to rain. It is common to use an umbrella as protection from the rain, but umbrellas do not protect the user from the injurous effects of lightning. In some instances the use of an umbrella even increases the risk of injury, by serving as an attractive target for lightning.

It is therefore an object of the invention to provide a portable lightning rod with an umbrella sheath and thereby provide protection against both rain and lightning.

Another object is to provide such a lightning rod with a conductive path of sufficient current carrying capacity that the rod will not disintegrate if struck by lightning.

An additional object is to provide such a lightning rod with a lower electrode having sufficient surface area that, when the electrode is inserted into the earth, an electric charge from lightning can be safely conducted to the ground via the electrode.

A further object of the present invention is to provide a portable lightning rod which may be either utilized on the ground or in a vessel upon a body of water.

An important feature of lightning rods according to the present invention is an electrically conductive central portion which collapses or folds for compactness when the lightning rod is not in use and which has an outer layer of insulating material to separate the central portion from the surrounding environment.

SUMMARY OF THE INVENTION

The present invention is a portable lightning rod which can be fitted with an umbrella sheath which unfolds for use and folds for storage or transporting. The sheath may be permanently secured to the lightning rod or detachable.

The lightning rod includes an upper electrode which is disposed above a central conductor that is electrically connected to a pointed lower electrode which can be embedded into the ground. A variety of lower electrode styles would be suitable, but the electrode would be selected to provide sufficient surface area for good electrical contact with the earth. A lower electrode constructed for insertion in the manner of a shovel is especially well suited for portable use.

Further in accordance with one embodiment of the present invention, the central conductor, which connects the upper and lower electrodes, comprises a flexible cable covered with a flexible insulating layer.

An alternative lower electrode for physical and electrical contact with a body of water includes a flexible insulated conductive cord extending from the bottom of the conductor. A weighted contact electrode is located at the free end of the cord to make electrical contact with the water body.

These and other features of the invention may best be understood by reference to the following description and drawings.

BRIEF DESCRIPTION OF THE DRAWINGS

In the drawings:

FIG. 1 is an elevation view showing a first embodiment according to the present invention including an extended central shaft;

FIG. 2 is an elevation view of the embodiment shown in FIG. 1 with the shaft contracted;

FIG. 3 is an enlarged vertical sectional view of a portion of the embodiment shown in FIG. 1;

FIG. 4 is an enlarged vertical sectional view of an alternative lower electrode for marine use;

FIG. 5 is an elevation view showing a second embodiment according to the present invention;

FIG. 6 is an enlarged partial plan view showing a grommet mounted on the umbrella sheath shown in FIG. 5;

FIG. 7 is an enlarged partial side elevation showing support wings mounted on the lightning rod shaft of FIG. 5;

FIG. 8 is an enlarged partial sectional view of the lightning rod shaft shown in FIG. 5 with parts broken away to show internal structure at the junction of a central conductor and an upper electrode;

FIG. 9 is an enlarged partial view, partly in section, of the connection between the central conductor and a lower electrode shown in FIG. 5;

FIG. 10 is an enlarged sectional view taken along line 10—10 in FIG. 5; and

FIG. 11 is a partial elevation view of another alternative lower electrode.

DESCRIPTION OF PREFERRED EMBODIMENTS

Referring now to FIG. 1, showing a first embodiment of the present invention, an umbrella 10 includes an umbrella sheath 11. The sheath may be of a type well known in the art and may be made of plastic or cloth. The sheath is foldably connected to a central shaft 12 by a framework of folding legs 13 hingedly connected to a central sleeve 14. The sleeve 14 is slidably and concentrically disposed about a central shaft 12 so that the sleeve 14 slides along the longitudinal axis of the shaft 12. The folding legs 13 and sleeve 14 are all made of an electrically insulative material.

The shaft includes a plurality of axially aligned interengaging and slidably cooperating telescoping sections as hereinafter described. An electrically conducting upper electrode 15 is disposed at the upper end of the shaft 12, such upper electrode having a continuous, closed outer surface. In particular a spherical upper electrode 15 is employed in the illustrated embodiment. An electrically conductive lower electrode 16 is retractably located at the lower end of the shaft 12 and has a sharp pointed tip portion 17 for physical and electrical contact with the earth 19.

Ramming means, comprising folding step plates 20, are hingedly connected to the shaft 12 and are movable in the direction of arrows 22 between either of two positions. In the first or upper position, the step plates are in physical contact with and parallel to the shaft for storage or transport of the portable lightning rod. In the second or lower position they are perpendicular to the central axis so that they may be used to ram the lower electrode 16 into the ground. In the second position, the step plates are braced against shaft 12 as illustrated in FIG. 1.

FIG. 2 shows an overall view of the portable lightning rod 10 with umbrella sheath 11 folded, shaft 12 in its contracted state, lower electrode 16 (not shown) retracted into the shaft and step plate 20 disposed between the two positions hereinbefore described. While in this configuration the portable lightning rod may conveniently be stored or manually carried for moving from place to place.

Referring to FIG. 3, the interior details of the shaft 12 are shown. These include telescoping sections 21 of a first type which are axially aligned with sections 23 of a second type for interengaging and slidably cooperating with the latter. Any suitable number and length of the cooperating telescoping sections 21 and 23 may be used.

The first type sections 21 include centrally disposed and electrically conductive center conductors 25 having enlarged collar portions 27 at their ends. These collar portions interengage and slidably cooperate with tubular conductor sheaths 29 located within the second type sections 23. The sheaths 29 have annular shoulder portions 31 concentrically and slidably disposed about the center conductor 25 and are fixedly covered with an insulative outer layer 33. Such layer has outwardly extending shoulder collar portions 35 disposed at its ends for mutual engagement and slidable cooperation within outer insulative tubes 37 disposed about the first type sections 21. Inwardly extending insulative collars 38 at the ends of tubes 37 limit the extent to which the collar portions 35 can slide inside each tube 37. The electrically insulative outer layer 33 is bonded to the tubular conductor sheath 29 allowing no movement therebetween.

Frictional abutment of the center conductors 25 and tubular conductor sheaths 29 permits sections 21 and 23 to "telescope" in the directions of arrows 39 allowing the portable lightning rod to be extended or contracted while maintaining electrical continuity between the central conducting portions of the shaft. As is apparent from FIG. 3, the entire central shaft 12 is electrically insulated from the environment by the insulative outer layer 33 and insulator tube 37 regardless of the length to which the umbrella shaft is extended.

In FIG. 3, upper electrode 15 is joined mechanically and electrically to the central electrically conducting portions 29 of the top telescoping section via an interposed electrode conductor rod 41 which is insulated from the environment by and centrally disposed within an upper insulative sheath 43 forming a larger diameter extension of the top outer layer 33. The umbrella sheath 11 is connected to the upper insulator sheath 43. When the umbrella is in its unfolded state as shown in FIG. 3, the collar 14 is disposed about the sheath 43. To move the umbrella to the folded state shown in FIG. 2, the collar 14 is slid downwardly in the direction of arrows 44 over the uppermost outer insulator tube 37 allowing the umbrella sheath 11 to be thereby folded inwardly towards the umbrella shaft.

The lower electrode 16 shown in FIG. 3 includes an upper shoulder portion 45 of larger diameter slidably positioned within lower conductor sheath 47. The sheath 47 is substantially tubular and has a lower, inwardly extending shoulder 49 at its lower end to engage the shoulder portion 45 and thus limit the downward travel of the lower electrode. Electrical continuity is maintained by frictional contact between the lower electrode 16 and the conductor sheath 47 of the bottom telescoping section. A cross-piece 51 is disposed centrally within the said lower conductor sheath 47 to provide a stop and bearing surface for spring 53 which is axially aligned and centrally disposed within the lower conducting sheath 47 between electrode 16 and cross-piece 51.

A central spring containing chamber defined by the lower sheath 47 provides sufficient room to receive the electrode 16 when the portable lightning rod is not in use. The lower conducting sheath 47 is covered with a lower insulating sheath 55. An upper shoulder portion 57 of sheath 55 is positioned to slide along the interior surface of the insulator tube 37 of the lowest section 21, and to engage the bottom collar 38 of such section and thereby limit the downward travel of the lower conductor and insulating sheath. A slidable insulated pin 59 is disposed radially through the lower conductor and insulator sheaths 47 and 55 thereby providing a stop to lock the lower electrode 16 in the extended position shown in FIG. 3. An engaging stop 61 is provided on the periphery of the lower electrode 16 for interengagement with said insulated pin 59 to lock the lower electrode 16 when in a retracted position inside the central chamber.

In the above described construction, an electrically conductive path is provided from upper electrode 15 through upper electrode conductor 41, and thence through tubular conductor sheaths 29 and center conductors 25. The path continues through each of the alternate telescoping sections 21 and 23, through lower conductor sheath 47, and thence to lower electrode 16. The entire shaft 12 is insulated from the environment at all times by an insulative layer comprised of electrode sheath 43, insulative sheaths 33, outer insulative tubes 37 and lower insulating sheath 55.

When it is desired that the portable lightning rod of the first embodiment be moved or transported to a new location, the umbrella sheath 11 is folded, the lower electrode 16 retracted and step plates 20 folded adjacent to central shaft 12. When in use, the portable lightning rod is deployed as shown in FIG. 1 with umbrella sheath 11 unfolded, central shaft 12 extended and lower electrode 16 engaging the ground. The lower electrode may conveniently be inserted in the ground by locking the lower electrode in the extended position by sliding pin 59 to engage shoulder portion 45 as shown in FIG. 3, folding the step plates 20 to their lower perpendicular position and applying pressure on the top of the step plates with the foot or another object.

Should lightning strike upper electrode 15, while the lower electrode is engaging the ground, the surge or charge is conducted to the ground 19 via the electrically conductive path through the central portions of shaft 12 and lower electrode 16. The insulative layers on the outside of the shaft insulate persons touching or standing near the portable lightning rod.

FIG. 4 shows an alternative lower electrode which is suitable for physical and electrical contact with a body of water 70. Attached to the lower conductor sheath 47 is a terminal 74. Electrically connected to the terminal 74 is a length of insulated flexible conductor cord 72 with a weighted contact electrode 76 at its free end.

This contact electrode is disposed beneath the surface of water 70 so that a continuous conductive path extends from the upper electrode 15 to the water 70.

The inner conductor of cord 72 may be made of any conductive material of sufficient size to adequately conduct an electric charge for lightning, such as metal wire, metal strap, woven cable, woven strap, or metal-coated rope, with the insulating material bonded thereto. Preferably, the cord 72 is detachable from the terminal 74. When so detached, the cord 72 may conveniently be stored on a reel 80 which may be positioned on one of the insulative tubes 37.

Another embodiment of the present invention comprises the grounding device shown in FIGS. 5-10. An umbrella 100 includes such standard features as a central shaft 102, a handle 103 at the base of the shaft 102, a sleeve 104 slidably surrounding the shaft 102. A sheath 106 is foldably connected to the shaft 102 and legs 108 which are hinged to the sleeve 104 and extend between the sleeve and umbrella ribs to support the sheath 106. Unlike common umbrellas, the sheath 106 of the umbrella 100 includes a grommet 110 which is located a small distance from the location where the sheath 106 attaches to the shaft 102. The grommet 110 defines a central opening 112 and includes self-closing flaps 114 which extend into and close the opening as shown in FIG. 6.

To conduct an electric charge from lightning to the earth, an electrically conductive path extends from a location above the umbrella 100 to the ground 116. For adequate protection of the user, this path should be of sufficient current carrying capacity to ground an electric charge from lightning without the disintegration of any of the grounding device components.

At the uppermost end of the grounding device is a rigid electrically conductive upper electrode 120. The upper electrode includes both a lower portion 122 and an upper portion 124 which is positioned to receive an electric charge from lightning. To facilitate the reception of such electric charge, the upper portion 124 terminates in a pointed tip 126 at its uppermost end. Swaged inside a cavity defined in the base of the lower portion 122 is one end of a flexible electrically conductive central cable 130 (FIG. 8) having an outer covering of insulating material. The cable 130 is thus electrically connected to the upper electrode 120 so that electric current will pass from the upper electrode to the cable.

The lowermost end of the cable 130 is swaged to a fitting 134 (FIG. 9) which is welded to the interior surface of an electrically conductive tube 138. The tube comprises an upwardly extending portion of a rigid electrically conductive lower electrode 140 which includes an electrically conductive plate 142 electrically connected to the tube 138. The plate 142 includes multiple vertical corrugations to enhance its strength and to provide sufficient surface area for good electrical contact between the earth 116 and the plate 142 when the plate is inserted endwise as shown in FIG. 5.

A flexible cable is desirable for use as a central conductor of the conductive path because such a flexible cable can be folded or coiled for storage without dissassembly of the conductive path. The cable is found to have advantages over collapsible conductors including joints, ferrules, or slidable parts which might corrode or accumulate dirt. Since the conductive path shown in FIG. 5 contains no interengageably movable components, it requires no maintenance provided that the components are of sufficient size and current carrying capacity that they will not disintegrate when carrying a charge of electricity from lightning.

To protect the user from a surge of current carried by the conductive path, an electrically insulative outer layer is provided to surround all portions of a conductive path except for the upper portion 124, including the lightning-receiving tip 126, of the upper electrode 120 and the conductive plate 142 of the lower electrode 140.

The outer layer includes a rigid two-piece electrically-insulative jacket having lower and upper segments 146, 147 which closely surround the lower portion 122 of the upper electrode 120 and also enclose an uppermost end portion of the central cable 130. The upper segment 147 has a radially extending annular flange 148 at its uppermost end to form an upwardly facing surface 150 which abuts the grommet 110 to limit the upward travel of the upper electrode 120 when it is inserted through the opening 112.

Covering the flexible cable 130 is a flexible layer 154 of insulating material. A portion of the flexible layer 154 extends inside the tubular jacket 146 so that the junction between the cable 130 and the lower portion 122 of the upper electrode is completely covered. At the lower end of the cable 130, the flexible layer 154 extends through an electrically insulative cap 158. As shown in FIG. 9, the cap 158 is secured over the top of the tube 138 and a tubular jacket 160 of insulating material which closely surrounds the tube 138. The uppermost end of the jacket 160 extends into the cap 158 so that the fitting 134 is completely sealed from the surrounding environment.

When the grounding device is in operating position to provide protection from both lightning and rain, the umbrella 100 is opened and the upper portion 124 of the upper electrode 120 is received in the opening 112 through the grommet 110 with the annular flange 148 abutting the bottom surface of the grommet 110 as shown in FIGS. 5 and 8. Wings 164, which extend radially outwardly from the tubular jacket 146, have lower edges 165 (see FIG. 7) at least one of which rests on top of an umbrella leg 108 which is located beneath the grommet 110. The bottom of the tubular jacket 146 is attached for support to the umbrella shaft 102 by an attachment clip 166. This structure securely mounts the upper electrode 120 at a small acute angle to the umbrella shaft 102.

As illustrated in FIG. 5, the upper portion 124 of the upper electrode 120 extends a predetermined distance above the umbrella 100. The predetermined distance is selected to be sufficient such that the umbrella is entirely contained within an area defined by a circular cone C which is coaxial with the upper electrode 120. The cone C has a vertex V located at the uppermost point of the tip 126 and has a generating angle $\theta$ of no more than sixty degrees and preferably of forty-five degrees.

It has been determined experimentally that a lightning rod provides protection from a lightning strike in the area of a vertical, circular cone having a generating angle of sixty degrees and a vertex located at the highest point of the lightning rod. Thus, if the device according to the present invention is held vertically and includes an upper electrode which extends the aforesaid predetermined distance above the umbrella sheath, all persons standing under the umbrella sheath will be within the zone of protection. The sheath therefore not only provides protection from rain, but also serves as an indicator to demarcate the area of lightning protection.

By limiting the generating angle θ of the cone C to forty-five degrees, a desirable margin of safety is provided so that the entire umbrella and any person standing thereunder will be within the cone of protection even if the lightning rod is tilted substantially from vertical. Also, when a generating angle θ of forty-five degrees is selected, the sheath and other umbrella parts will be contained within the zone of lightning protection under all normal operating conditions. It is thus unnecessary to construct the umbrella of entirely non-conductive materials as might be required if the upper electrode did not extend the desired predetermined distance above the sheath.

Use of the embodiment shown in FIGS. 5-10 is similar to the operation previously described. The umbrella 100 is opened, the upper portion 124, including the tip 126, of the electrode 120 is inserted through the grommet 110 and the tubular jacket 146 is clipped to the umbrella shaft 102 using the clip 166 with at least one of the wings 164 positioned to rest on a leg 108. When the upper electrode is so installed, the hand held umbrella shaft 102 serves as an upright support member which maintains the upper electrode 120 substantially vertical. Next, the plate 142 is driven into the ground 116 in the manner of a shovel. The lightning rod shown in FIGS. 5-10 can be used independently of the umbrella. Likewise, if lightning is not an anticipated problem, the umbrella 100 can be utilized independently of the grounding device. When the upper electrode 120 is removed from the grommet 110, the grommet flaps 114 close the opening 112 to prevent rain leakage therethrough.

Another alternative embodiment of a lower electrode is shown in FIG. 11. This electrode includes a metal auger 170 which can be rotated to bore into the earth. The large surface area of the auger blades provides the needed electrical contact for carrying an electrical charge from lightning to the earth. The auger-type lower electrode can be used in place of the lower electrodes shown in FIGS. 1 and 5.

While I have shown and described preferred embodiments of my invention, it will be apparent to those skilled in the art that changes and modifications may be made without departing from the invention in its broader aspects. For example, the conductive path elements of the grounding device shown in FIG. 5 might be used independently of an umbrella sheath or could be used in conjunction with some different shelter such as a tent.

To protect the occupants of a tent from lightning, the upper portion 124 of the upper electrode 120 could be inserted through a grommet in the tent's fabric and the lower segment 146 of the insulation jacket connected to a tent pole using the clip 166 or a suitable alternate attachment. Assuming that the tip 126 of the upper electrode 120 extends a sufficient distance above the tent, the tent and all its contents would be in the zone of protection provided by the grounding device. Multiple grounding devices could be utilized for large tents to provide a protective zone of sufficient volume to encompass the entire tent.

I claim:

1. A portable lightning rod comprising:
   path means defining an electrically conductive path of sufficient size and current carrying capacity to conduct an electric charge from lightning without disintegration, said path means including:
   a. an electrically conductive upper electrode disposed at the uppermost end of said lightning rod and having a lightning-receiving portion adapted to receive an electric charge from lightning,
   b. an electrically conductive lower electrode disposed at a lower end of said lightning rod and having sufficient surface area for physical and electrical contact with the earth so that, when said lower electrode is installed in the earth, an electric charge from lightning can be conducted to the earth via said lower electrode, and
   c. an electrically conductive central portion electrically connecting said upper and lower electrodes for passage of electrical current therethrough;
   an electrically insulative outer layer surrounding said central portion for the electrical insulation of said central portion from the environment; and
   an umbrella sheath having an opening therethrough, said sheath being positionable adjacent to the upper end of said lightning rod so that said electrically conductive path means extends through said opening.

2. The lightning rod as claimed in claim 1 wherein:
   said upper electrode includes a continuous, closed outer surface for receiving an electrical charge from lightning;
   and said lower electrode includes a sharp, pointed tip portion for ease of physical insertion into the earth for establishing electrical contact therewith, retraction means for retracting said electrode into said central portion when not in use, and folding step plates hingedly mounted on said central portion for forcing said electrode into the earth for physical and electrical contact therewith.

3. The lightning rod as claimed in claim 1 wherein said lower electrode includes a flexible, electrically conductive tail portion for immersion into a marine environment for physical and electrical contact therewith.

4. The lightning rod as claimed in claim 1 wherein said lower electrode comprises an electrically conductive plate with multiple vertical corrugations, said plate being insertable end-wise into the earth.

5. The lightning rod as claimed in claim 1 wherein said lower electrode comprises an electrically conductive auger for boring into the earth.

6. The lightning rod as claimed in claim 1 wherein said central portion comprises a flexible cable.

7. The lightning rod as claimed in claim 6 wherein said insulative outer layer comprises:
   a rigid tubular jacket of insulating material closely surrounding a lower portion of said upper electrode and an uppermost end portion of said cable;
   a flexible layer of insulating material closely surrounding said cable; and
   a tubular jacket of insulating material closely surrounding all portions of said lower electrode which are not received by the earth.

8. The lightning rod as claimed in claim 1 further comprising:
   an umbrella shaft to which said sheath is foldably connected;
   a sleeve slidably surrounding said shaft; and
   hinged legs extending between said sheath and said sleeve.

9. The lightning rod as claimed in claim 8 further comprising a grommet mounted on said sheath to provide and reinforce said opening therethrough at a small distance from the location where said sheath attaches to said shaft, said grommet:
- defining a central opening which receives said upper electrode so that said upper electrode extends above said sheath; and
- having self-closing flaps which extend into and close said opening when said upper electrode is removed.

10. The lightning rod as claimed in claim 8 wherein:
- said insulative outer layer has a radially extending annular flange at its uppermost end;
- said opening through said sheath is at a small distance from the location where said sheath attached centrally to said shaft;
- said opening removably receives said upper electrode and is of smaller diameter than said annular flange so that said upper electrode extends above said sheath and said insulative outer layer extends below said sheath;
- said insulative outer layer further comprises wings which extend radially outwardly, each of said wings including a lower edge adapted to rest on top of one of said legs; and
- said lightning rod further comprises an attachment clip which insulatingly supports said upper electrode from said umbrella shaft so that said upper electrode extends upwardly away from said shaft at a small acute angle.

11. The lightning rod as claimed in claim 1 wherein said upper electrode extends a sufficient distance above said sheath that said sheath is entirely contained within an area defined by a circular cone which:
- is coaxial with said upper electrode;
- has a vertex at the uppermost end of said upper electrode; and
- has a generating angle of no more than sixty degrees.

12. The lightning rod as claimed in claim 11 wherein said cone has a generating angle of forty-five degrees.

13. The lightning rod as claimed in claim 1 further comprising a framework for supporting said sheath, said framework and said sheath being made of electrically insulative material.

14. A portable lightning rod comprising:
path means defining an electrically conductive path of sufficient current carrying capacity to conduct an electric charge from lightning without disintegration, said path means including:
- a. a rigid electrically conductive upper electrode disposed at the uppermost end of said lightning rod and having a lower portion and a lightning-receiving upper portion which terminates at its uppermost end in a pointed tip to facilitate the reception of an electric charge from lightning,
- b. A rigid electrically conductive lower electrode disposed at a lower end of said grounding device and having an electrically conductive tube portion extending upwardly from and electrically connected to an electrically conductive plate with multiple vertical corrugations and sufficient surface area so that, when said plate is inserted edge-wise into the earth, an electric charge from lightning can be conducted to the earth via said lower electrode, and
- c. a flexible electrically conductive central cable electrically connecting said upper and lower electrodes for passage of electrical current therethrough;

an electrically insulative outer layer surrounding all portions of said conductive path except for said lightning receiving upper portion and said conductive plate, said outer layer including:
- a. a rigid tubular jacket of insulating material closely surrounding said lower portion of said upper electrode and an uppermost end portion of said central cable, said jacket having a radially extending annular flange at its upper most end,
- b. a flexible layer of insulating material closely surrounding said central cable, and
- c. a tubular jacket of insulating material closely surrounding said tube portion of said lower electrode and a lowermost end portion of said central cable;

an umbrella including a central shaft, a sleeve slidably surrounding said shaft, a sheath foldably connected to said shaft, and hinged legs extending between said sheath and said sleeve;

a grommet of electrically insulative material mounted on said sheath to provide a reinforced opening therethrough at a small distance from the location where said sheath attaches to said shaft, said grommet:
- a. defining a central opening which removably receives said upper portion of said upper electrode and is of smaller diameter than said annular flange so that said upper portion extends above said sheath and said lower portion of said upper electrode extends below said sheath, and
- b. having self-closing flaps which extend into and close said central opening when said upper portion is removed;

wings extending radially outwardly from said rigid tubular jacket, each of said wings including a lower edge which is adapted to rest on top of one of said legs; and an attachment clip which connects a bottom portion of said rigid tubular jacket to said shaft for support thereby so that said rigid tubular jacket extends upwardly at a small acute angle to said shaft;

said upper portion of said upper electrode extending a sufficient distance above said umbrella so that said umbrella is entirely contained within an area defined by a circular cone which:
- a. is coaxial with said upper electrode,
- b. has a vertex at said tip, and
- c. has a generating angle of forty-five degrees.

15. A portable lightning rod comprising:
path means defining an electrically conductive path of sufficient current carrying capacity to conduct an electric charge from lightning without disintegration, said path means including:
- a. a rigid electrically conductive upper electrode disposed at the uppermost end of said lightning rod and having a lower portion and a lightning-receiving upper portion which terminates at its uppermost end in a pointed tip to facilitate the reception of an electric charge from lightning,
- b. a rigid electrically conductive lower electrode disposed at a lower end of said lightning rod and having sufficient surface area for physical and electrical contact with the earth so that, when a portion of said lower electrode is inserted into the earth, an electric charge from lightning safely can be conducted to the earth via said lower electrode, and c. a flexible electrically conductive central cable electrically connecting said upper and lower electrodes for passage of electrical current therethrough;

an electrically insulative outer layer surrounding all portions of said conductive path except for said lightning receiving upper portion and said portion of said lower electrode which is inserted into the earth, said outer layer including:

a. a jacket of insulating material surrounding said lower portion of said upper electrode, b. a flexible layer of insulating material surrounding said central cable, and c. a jacket of insulating material surrounding portions of said lower electrode which otherwise would be exposed when said lower electrode is inserted into the earth; and attachment means for connecting said jacket of said upper electrode to an upright support member for maintaining said upper electrode substantially vertical.

* * * * *